United States Patent [19]

Davis

[11] Patent Number: 4,807,584
[45] Date of Patent: Feb. 28, 1989

[54] FUEL TANK HEATING SYSTEM

[75] Inventor: Leland L. Davis, Saline, Mich.

[73] Assignee: Davco Manufacturing Corp., Ann Arbor, Mich.

[21] Appl. No.: 120,185

[22] Filed: Nov. 9, 1987

Related U.S. Application Data

[63] Continuation of Ser. No. 676,869, Nov. 30, 1984, abandoned.

[51] Int. Cl.⁴ .................. F02M 31/12; F02M 31/14
[52] U.S. Cl. ................................. 123/557; 123/549
[58] Field of Search ............. 123/557, 549, 558, 522, 123/523

[56] References Cited

U.S. PATENT DOCUMENTS

| | | | |
|---|---|---|---|
| 1,382,995 | 6/1921 | Lucke | 123/557 |
| 1,819,474 | 8/1931 | Meyer | 123/557 |
| 2,437,453 | 3/1948 | Belgau . | |
| 2,747,555 | 5/1956 | Brunner . | |
| 2,882,882 | 4/1959 | Pantano | 123/523 |
| 2,980,172 | 4/1961 | Thompson . | |
| 3,354,872 | 11/1967 | Gratzmuller . | |
| 3,713,429 | 1/1973 | Dwyre | 123/552 |
| 3,768,730 | 10/1973 | Campbell . | |
| 3,962,999 | 6/1976 | Rehm . | |
| 3,989,019 | 11/1976 | Brandt et al. . | |
| 4,003,356 | 1/1977 | Naylor . | |
| 4,044,742 | 8/1977 | Linder | 123/557 |
| 4,237,850 | 12/1980 | Connor et al. . | |
| 4,286,551 | 9/1981 | Blitz . | |
| 4,312,317 | 1/1982 | Jewett | 123/552 |
| 4,323,046 | 4/1982 | Barber | 123/557 |
| 4,338,907 | 7/1982 | Lindbeck | 123/557 |
| 4,368,716 | 1/1983 | Davis . | |
| 4,370,970 | 2/1983 | Kunz | 123/557 |
| 4,372,280 | 2/1983 | Adams | 123/557 |
| 4,395,996 | 8/1983 | Davis . | |
| 4,411,240 | 10/1985 | Kravetz . | |
| 4,489,708 | 12/1984 | Yamamoto et al. | 123/557 X |
| 4,509,464 | 4/1985 | Hansen | 123/557 |
| 4,515,135 | 5/1985 | Glass | 123/557 |
| 4,516,556 | 5/1985 | Meyer | 123/552 X |

FOREIGN PATENT DOCUMENTS 1255831 12/1971 United Kingdom .

Primary Examiner—Tony M. Argenbright
Attorney, Agent, or Firm—Harness, Dickey & Pierce

[57] ABSTRACT

An improved fuel heating system particularly adapted for fuel oil combustion machines such as diesel powered motor vehicles and stationary generating plants is disclosed. The appratuses include a fuel processing device which is integral or separate from a fuel tank which warms fuel before it is delivered to the fuel consuming device. The apparatuses further include a mechanism for heating fuel within the fuel tank in order to warm it to a flowable condition so that it can be transmitted to the fuel processor for further heating. Several embodiments are described wherein the fuel processor and main fuel reservoir are within the same vessel and separated only by a fluidtight wall. In another embodiment, a fuel processor unit is physically separated from the fuel tank. Various means are described for communicating heat within the fuel processor to the main fuel reservoir including conduits conducting engine coolant and ror or plate type heat conductors. This invention provides fuel heating systems which are capable of quickly supplying warmed fuel to a fuel oil fired device and further provides such heating in a highly efficient manner.

7 Claims, 2 Drawing Sheets

FUEL TANK HEATING SYSTEM

This is a continuation of U.S. patent application Ser. No. 676,869, filed Nov. 30, 1984 and entitled fuel tank heating system, now abandoned.

BACKGROUND AND SUMMARY OF THE INVENTION

This invention relates to a fuel heating system and particularly, to a system for heating fuel oil within a fuel tank before it is conducted into a fuel delivery circuit.

Diesel engine powered machines such as motor vehicles, stationary generating plants, and other fuel oil combustion devices are often operated in environmental conditions wherein the fuel oil and fuel delivery circuit are subjected to cold ambient temperatures. At sufficiently low temperatures, fuel oils become viscous, and develop paraffin or wax particles. These fuels have characteristic temperatures at which they become "cloudy" due to the pressure of dispensed wax crystals and at which they "freeze" or become a semi-solid mass, referred to as their cloud and pour points, respectively. Often fuel oil in use is exposed to these critical temperatures. Some diesel engine fuels have a cloud point of 20 degrees Fahrenheit and a pour point of 0 degrees Fahrenheit. Additionally, water which invariably is mixed with the fuel oil can freeze, forming ice particles. Such conditions may severely restrict fuel flow within the fuel delivery circuit, leading to reduced power output or complete inoperability of the associated fuel consuming device. Such problems obviously occur when the fuel reduces the point of solidification. Cloudy fuel may also lead to fuel flow restrictions when the suspended wax particles accumulate in filter elements and at other points in the fuel system. One method of preventing this condition is to maintain the fuel temperature above its cloud and pour points. This approach, however, is not always possible since adequate heat or power may not be available during storage periods, or while the associated fuel oil fired device is not operating.

In order to address such problems, many users of fuel oil combustion devices such as diesel engines provide fuel processing devices within the fuel delivery circuit. A number of such devices are described by my previously issued U.S. Pat. Nos.: 4,368,716; 4,428,351; 4,395,996; 4,421,090; and my currently pending patent applications; Ser. Nos.: 463,041, filed Feb. 1, 1983; 573,292, filed Jan. 23, 1984; and 653,854, filed Sept. 24, 1984. Many of the fuel processors and fuel heating apparatuses described by the preceding patents and patent applications further provide water separation and particulate filtration functions. Although these devices are entirely satisfactory in heating fuel drawn from a fuel reservoir in sufficiently cold ambient temperatures or when prolonged cold soaking occurs, it may be difficult or impossible to draw fuel from the fuel tank. In such conditions, the fuel oil within the fuel tank can become an essentially immovable mass of completely waxed fuel. In addressing such problems, designers of fuel heating systems in the past have attempted to overcome such difficulties by supplying a sufficient level of heat energy to the fuel tank to melt the entire contents. However, such approaches require such extremely high power requirements as to be inefficient or prohibitive.

In view of the above, it is an object of this invention to provide an apparatus which acts to warm fuel within a fuel tank prior to its introduction into the remainder of the fuel delivery circuit. It is a further object of this invention to accomplish such fuel heating using a minimal power input requirement. Additional objects of the invention are to provide such fuel heating employing a minimum of components and providing a system simple in configuration and operation.

The above objects of this invention are achieved by employing a fuel processor device which acts as a small-capacity fuel reservoir which provides warmed fuel for initial operation, and a larger capacity main fuel reservoir which holds the bulk of the stored fuel. The larger capacity main fuel reservoir includes heating means associated with the fuel processor to provide a sufficient flow rate of warmed fuel to sustain continued operation of the associated fuel oil fired device. High overall thermal efficiency is provided by heating a very small quantity of fuel oil for initial start-up and by providing a steady state energy input level into the main fuel reservoir which warms fuel to provide a flow rate of warmed fuel related to the fuel consumption rate of the fuel consuming device. No attempt need be made in accordance with this invention to maintain the entire contents of the main fuel reservoir in a wax-free state, even while the fuel consuming device is operating.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
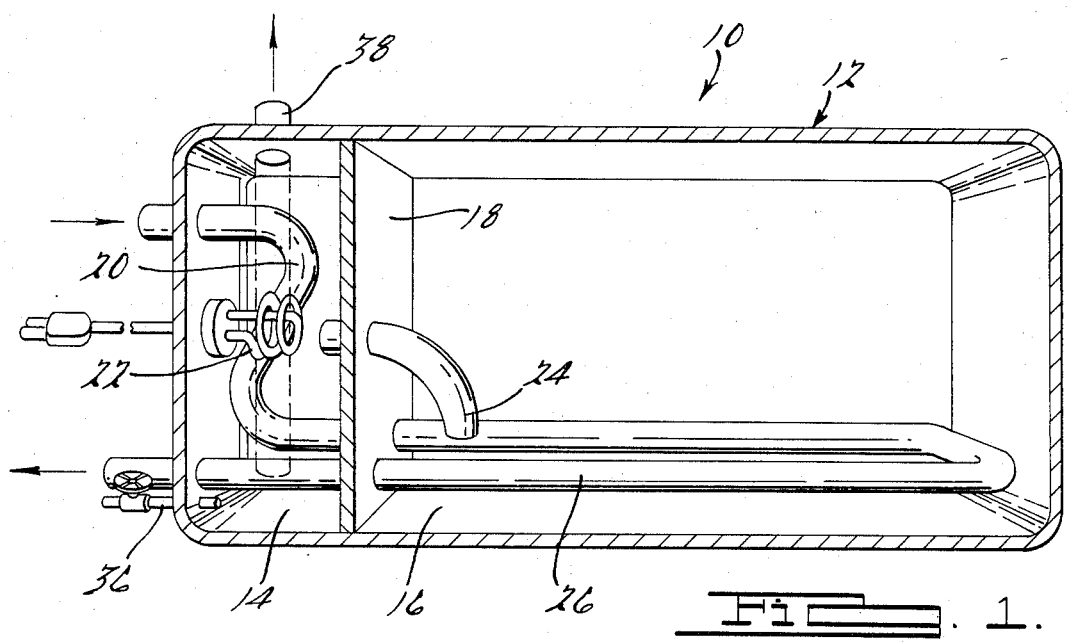
FIG. 1 is a cross-sectional view of a fuel heating system according to a first embodiment of this invention which employs a separated fuel tank having a fuel processing section and a main fuel reservoir section, and having a heated fluid conducting conduit disposed in both fuel tank sections.

A fuel heating system according to a first embodiment of this invention is shown in FIG. 1 and is generally designated there by reference character 10. System 10 is particularly adapted for use in a fuel supply system for a diesel engine powered device such as a motor vehicle or a power generating plant. System 10, and those described hereinafter, however, may be used in conjunction with any type of fuel combustion operated device, including turbine engines, furnaces, etc. Fuel heating system 10 includes fuel tank 12 which is divided into two sections, fuel processing section 14 and main fuel reservoir section 16, which are physically separated by wall 18. Fuel processing section 14 includes internally disposed conduit 20 which conducts a heated fluid such as engine coolant within fuel processing section 14 and is in heat exchange relationship with the fuel therein, thereby warming the fuel. Additionally, fuel processing section 14 may include electric immersion heater 22 which may be employed to maintain the temperature of the fuel within the fuel processor section 14 at a level above its cloud point, thereby maintaining the associated device in a state of constant readiness. Electric immersion heater 22 may also be energized a short time period before attempted start-up of the associated fuel oil fired apparatus, thereby warming a small quantity of fuel for initial operation. Wall 18 may be formed from any suitable material, for example, sheet metal, and acts to separate the fluids within fuel tank 12 into two sections. Fuel outlet conduit 38, disposed in fuel processing section 14, serves to conduct fuel to the remaining branches of the fuel delivery circuit or to a particulate filter mounted within or to fuel tank 10. The use of such particulate filters mounted directly to a fuel tank having a fuel heating section is disclosed in my issued U.S. Pat. No. 4,395,996 which is hereby incorporated by reference. Drain valve 36 is optionally provided to permit the periodic removal of water or other impurities which collect in the lower portion of section 14.

In accordance with this embodiment, conduit 20 is elongated to have a portion thereof, identified by reference number 26, which extends into a lower portion of main fuel reservoir section 16. Conduit portion 26 preferably is shaped to provide an optimum or adequate heat transfer surface and is positioned immediately above a portion of the floor of tank 12. Engine coolant or another heated fluid such as oil, exhaust gases, etc. is preferably conducted within conduit 20 such that it is first conducted into section 14 and thereafter into section 16. This direction of flow insures that the greatest amount of heat available for fuel warming is provided in fuel processor section 14. Fuel pickup tube 24 forms a fuel communication path between sections 14 and 16. Fuel pickup tube 24 has an inlet which is located in close proximity with conduit 26 within fuel storage section 16 and is preferably positioned between the legs of conduit 26. Further, fuel pickup tube 24 is preferably located slightly above conduit 26. This relationship of fuel pickup tube 24 with respect to conduit 26 provides a location desirable from a heat transfer view point to provide warmed fuel to fuel processing section 14.

In order to maximize the useful fuel capacity of fuel tank 12, it may be desirable to locate conduit 26 and fuel pickup tube 28 in a locally depressed sump section of the tank. The tank shapes shown herein are provided for illustrative purposes only.

In operation, when used in a diesel engine fuel delivery system, energy is applied to electric heater 22 constantly or during a predetermined period of time prior to engine start-up. This energy input warms a small volume of fuel within fuel processing section 14. When liquified fuel is available, it is transmitted from section 14 to the associated diesel engine or other fuel consuming device. Upon engine warmup, heated engine coolant, lubricating oil, exhaust gases or an intermediate heat exchange fluid become available for transmission into conduits 20 and 26. When the circulated fluid reaches a suitable temperature, the entire volume of fuel processing section 14 becomes warmed. Heated fluid flow within conduit 26 causes localized warming of the fuel within main fuel reservoir section 16. This localized warming provides fuel in a flowable state adjacent the inlet of fuel pickup tube 24. As previously stated, it is not necessary to completely warm the entire contents of fuel storage section 16. In fact, it has been found that the formation of a continuous surface of paraffin on the interior surfaces of fuel storage section 16 actually enhances the efficiency of the fuel warming effect provided by conduit section 26, since it acts as an efficient insulating layer. Further, this insulating layer prevents excessive heat loss from fuel processing section 14 when electric heater 22 is energized. Efficiency of the system is provided since the amount of fuel initially heated within fuel processing section 14 is only that quantity necessary to sufficiently warm the engine until a hot fluid for fuel warming becomes available. Fuel within main fuel reservoir section 16 is heated at the rate at which it is being consumed by the associated engine. Control over the system may be provided by employing a temperature sensitive element which modulates energy supplied to electric heater 22. Similarly, the flow of fluid within conduits 20 and 26 may be controlled to prevent fuel overheating.

In those applications where electric heater 22 is not employed, other means are preferably employed to provide a quantity of warmed fuel required to support internal combustion. Thereafter, when a warmed fluid becomes available for transmission within conduits 20 and 26, the fuel becomes warmed in a progressive manner, to above its pour point in main fuel reservoir section 16 to a more elevated temperature (preferably above the fuel's cloud point) in fuel processing section 14.

Figure 2:
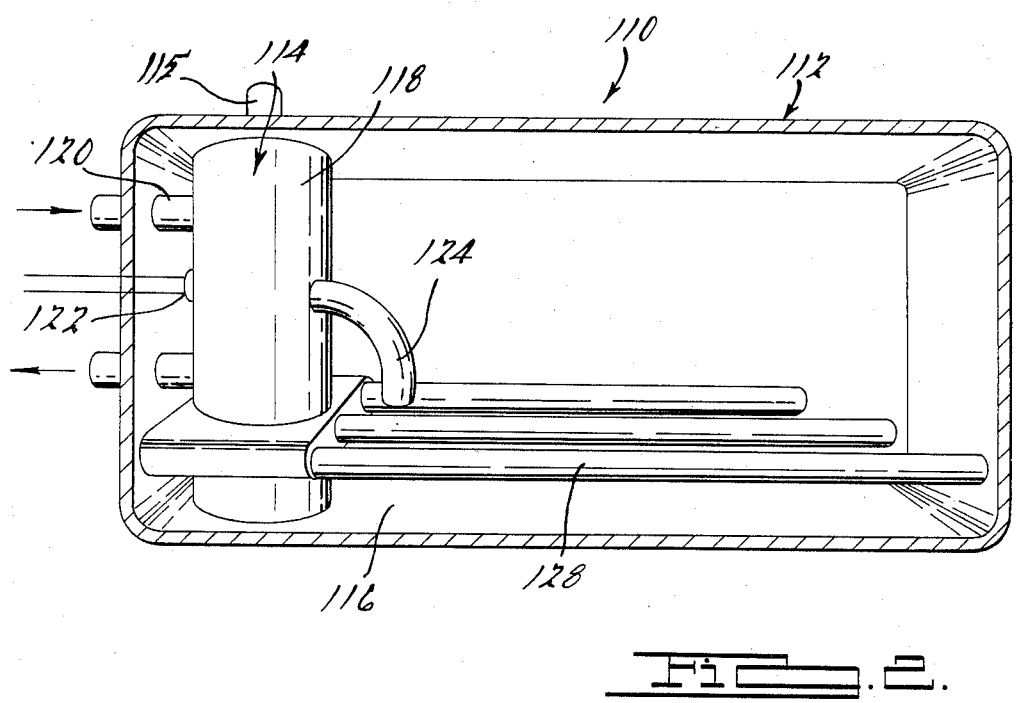
FIG. 2 is a cross-sectional view of a fuel heating system according to a second embodiment of this invention wherein heat conducting members are placed in thermal communication with the fuel processing section of a separated fuel tank which conducts heat into the main fuel reservoir section of the tank.

A second embodiment according to this invention is shown in FIG. 2. Fuel heating system 110, like the first embodiment, includes fuel tank 112, divided into two sections; fuel processing section 114 and main fuel reservoir section 116. This embodiment varies from the first, however, in that wall 118 forms a fully enclosed vessel which is surrounded by fuel within section 116. Disposed within processing section 114 is a heat source comprising, for example, conduit 120 which conducts a heated fluid such as engine coolant within that section. Electrical immersion heater 122 may also be installed within fuel processing section 116 as an additional or exclusive heat source and may be continuously energized or energized a short period of time prior to engine start-up. Outlet conduit 115 allows fuel to be removed from fuel processing section 114. This embodiment varies principally from the first in that conduit 120 is not extended to form a section 26 within main fuel reservoir section 116. Instead, other means are employed to conduct heat into section 116 to provide initial warming of fuel within that section. For this embodiment, heat from section 114 is conducted into main fuel reservoir section 116 using heat radiating rods or tubes 128 which are attached to wall 118 in a manner permitting conductive heat transfer between these components. Rods 128 are preferably made from a metal exhibiting high heat conduction properties such as copper or aluminum. Heat is transferred through conduction to rods 128 and is thereafter dissipated to fuel surrounding the rods. Like the first embodiment, fuel pickup tube 124 is employed which communicates fuel processing section 114 with fuel storage section 116. The orientation of pickup tube 124 is also like that previously described, i.e. it is placed in close proximity with the heat source and preferably vertically above it, thereby taking advantage of heat transfer principles to provide efficient preheating of fuel.

A number of variations of the second embodiment of fuel heating system 110 are also well within the scope of this invention. For example, a solid plate could be used in place of rods or tubes 128. Additionally, so-called "heat pipes" could be used which are tubular members filled with a two-phase heat transport media. These devices exhibit exceptional heat transfer capabilities since they approach maintaining their entire surface at a uniform temperature despite localized thermal loadings. The use of heat radiating rods or pipes or other heat conduction means described in conjunction with this embodiment could also be employed with the planar shaped wall 18 of the first embodiment.

Figure 3:
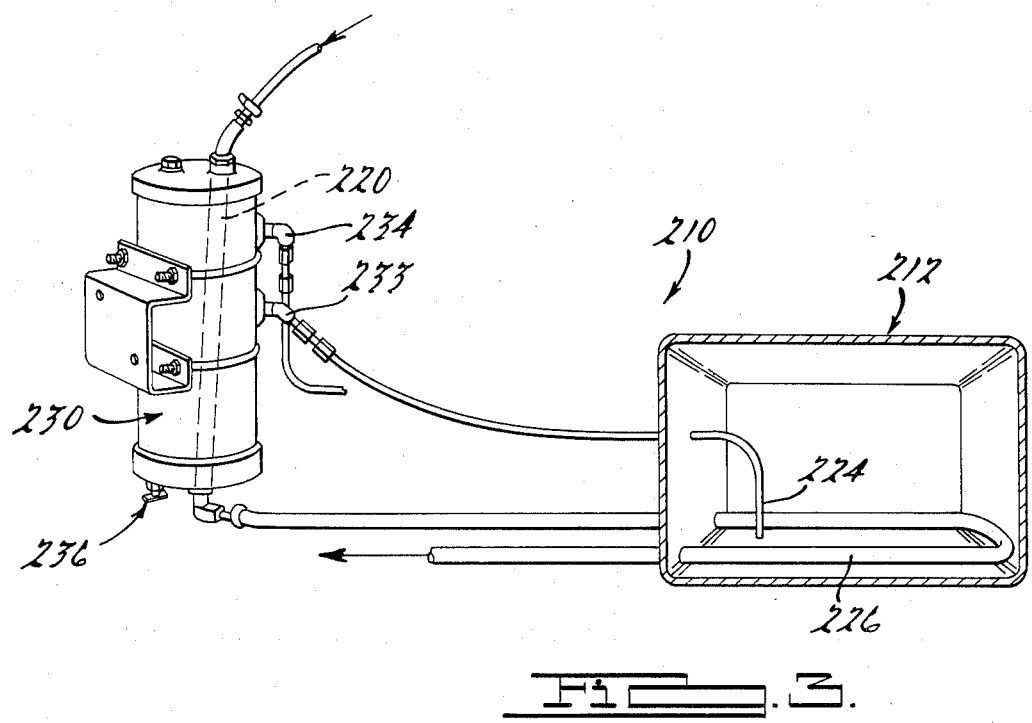
FIG. 3 is a pictorial view of a fuel processor and a cross-sectional view of a fuel tank of a third embodiment of this invention wherein the fuel processor and fuel tank components are physically separated and include means for conducting a heated fluid into a conduit within the fuel tank for heating fuel therein.

A third embodiment of a fuel heating system according to this invention is shown with reference to FIG. 3 and is designated there by reference character 210. This embodiment differs from the two previously described in that the fuel processing apparatus is physically separated from fuel tank 212. As shown in FIG. 3, a separate fuel processor 230 is employed. This device may be any high-performance fuel processor which provides fuel heating such as that described by my issued U.S. Pat. No. 4,368,716. Fuel processor 230 includes an internally disposed heated fluid conducting conduit 220, and fuel inlet and outlet 233 and 234, respectively. Fuel processor 230 may also include an auxilliary electric heater (not shown) and may further include a manually or automatically actuated drain valve 236. Another conduit 226 is disposed within fuel tank 212 in a fashion similar to that of the first embodiment. Similarly, fuel pickup tube 224 is provided and oriented as previously described. Conduits are provided which communicate fuel pickup tube 224 with fuel processor 230 and conduit 220 with conduit 226. Otherwise, this device performs precisely like the first embodiment, in that a heated fluid, such as engine coolant, is conducted into the fuel processor 230 and thereafter into conduit 226 to provide localized warming of fuel in main fuel reservoir section 216.

Figure 4:
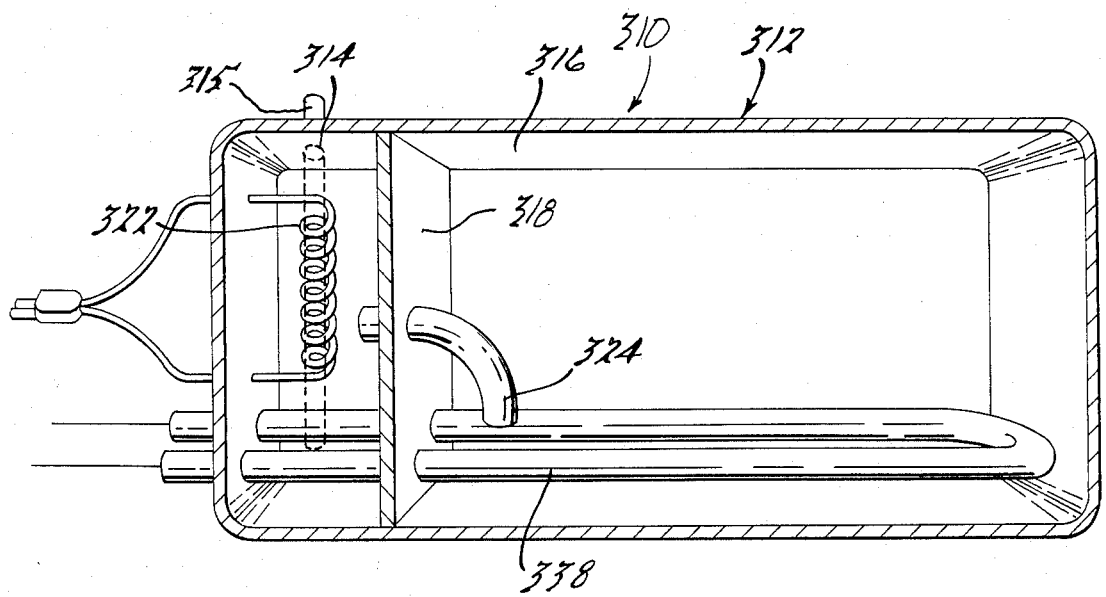
FIG. 4 is a cross-sectional view of a fuel heating system according to a fourth embodiment of this invention wherein a pair of electrically energized heating devices are employed.

A fourth embodiment of a fuel heating system according to this invention is illustrated in FIG. 4. This embodiment is similar to the first two in that fuel tank 312 is divided into two sections, fuel processing section 314 and main fuel reservoir section 316 by wall 318. For this embodiment, conduit 20 is eliminated and section 314 is heated exclusively by electrical immersion heater 322. Outlet conduit 315 allows fuel to be removed from fuel processing section 314. Other heat sources, however, could be employed. This heater may be constantly energized or energized a predetermined period of time before engine start-up. Once an engine is started, and particularly when it is used to power an electric generator, high levels of electrical power become available. In accordance with this embodiment of the invention, a second immersion heater 338 is provided which extends into main fuel reservoir section 316. Therefore, after engine start-up, electrical power is provided to heater 338 to warm fuel in the vicinity of fuel pickup tube 324. In accordance with this embodiment, heater 338 also acts to conduct heat within fuel processing section 314 provided by heater 322, even while the second heater 338 is not energized. This is accomplished by mounting a portion of heater 338 within section 314 and making the heater from a heat conducting material. Therefore, prior to energization of heater 338, fuel in the vicinity of fuel pickup tube 324 is heated to a point where it can be drawn into section 114 in a manner like that according to the second embodiment shown in FIG. 2. The proximity of fuel pickup tube with heater 338 is substantially like that previously described for the previous embodiments. An automatic control system like that described previously is needed for the apparatus shown in FIG. 4. Such control could be achieved by employing a separate temperature sensor or by employing a self limiting device for heaters 322 and 338 such as those made from positive temperature coefficient (PTC) materials.

While the above description constitutes the preferred embodiments of the present invention, it will be appreciated that the invention is susceptible to modification, variation and change without departing from the proper scope and fair meaning of the accompanying claims.

What is claimed is:

1. A fuel supply system of a combusion device for heating fuel, comprising:
    a fuel tank,
    a partition dividing said fuel tank into a fuel processing section and a fuel reservoir section, said fuel processing section adapted to retain a volume of fuel which is substantially less than the fuel volume capacity of said fuel reservoir section,
    first fuel heating means disposed in said fuel processing section and confined to said fuel processing section for heating fuel within said fuel processing section for providing heated fuel for initial operation of the combustion device,
    second fuel heating means for heating fuel within both said fuel processor section and said fuel reservoir section for providing heated fuel for sustained operation of the combustion device, said first and second heating means being independently operable and controllable, and
    conduit means for transferring fuel from said fuel reservoir section and into said fuel processing section and for transferring fuel out of said fuel processing section, said conduit means including a fuel pickup tube disposed in said fuel reservoir section for conducting fuel out of said fuel reservoir section from a location in close proximity with said second fuel heating means.

2. A fuel supply system according to claim 1 wherein said first fuel heating means comprises an electrical immersion heater disposed in said fuel processing section.

3. A fuel supply system according to claim 1 wherein said second fuel heating means comprises an electrical immersion heater extending into both said fuel processing section and said fuel reservoir sections.

4. A fuel supply system according to claim 1 wherein said second fuel heating means comprises a conduit extending through said fuel processing section and said fuel reservoir sections and adapted for conducting a heated fluid.

5. A fuel supply system according to claim 1 wherein said second fuel heating means comprises a heat transfer member in thermal contact with said partition for transferring heat from said fuel processing section to said fuel reservoir section.

6. A fuel supply system according to claim 1 wherein said partition is a generally planar wall.

7. A fuel supply system according to claim 1 wherein said partition is a generally cylindrical wall with said fuel processing section defined by the interior of said cylindrical wall.

* * * * *